US012293628B2

(12) United States Patent
Smith

(10) Patent No.: US 12,293,628 B2
(45) Date of Patent: May 6, 2025

(54) SYSTEM AND METHOD FOR MANAGING A CASINO-STYLE BATTLESHIPS GAME

(71) Applicant: Eric Smith, Edmonton (CA)

(72) Inventor: Eric Smith, Edmonton (CA)

( * ) Notice: Subject to any disclaimer, the term of this patent is extended or adjusted under 35 U.S.C. 154(b) by 367 days.

(21) Appl. No.: 18/071,527

(22) Filed: Nov. 29, 2022

(65) Prior Publication Data

US 2024/0177557 A1 May 30, 2024

(51) Int. Cl.
*G07F 17/32* (2006.01)

(52) U.S. Cl.
CPC ........ *G07F 17/322* (2013.01); *G07F 17/3265* (2013.01); *G07F 17/3293* (2013.01)

(58) Field of Classification Search
CPC .... G07F 17/32; G07F 17/322; G07F 17/3227; G07F 17/3288; G07F 17/3293; G07F 17/34; A63F 3/00157; A63F 1/00; A63F 1/04; A63F 2001/001; A63F 2001/003; A63F 2001/005; A63F 2001/006; A63F 2001/008; A63F 2001/0475; A63F 2001/0483
See application file for complete search history.

(56) References Cited

U.S. PATENT DOCUMENTS

| | | | | |
|---|---|---|---|---|
| 6,550,772 B1 * | 4/2003 | Streeks | A63F 3/00157 273/274 |
| 7,025,354 B1 * | 4/2006 | Jones | A63F 3/00157 273/274 |
| 2006/0035700 A1 * | 2/2006 | Van Asdale | G07F 17/32 463/19 |
| 2010/0283205 A1 * | 11/2010 | Mahon | A63F 1/00 273/292 |

* cited by examiner

*Primary Examiner* — Milap Shah
(74) *Attorney, Agent, or Firm* — David W. Barman; Shlomo S. Moshen

(57) ABSTRACT

A System and method for managing a game of casino battleships comprising a plurality of game grids, a plurality of game tokens and a plurality of game cards. Each game grid has a plurality of predefined game positions upon which to place the game tokens, each position has a unique identifier code corresponding to a unique identifier code of game card. The apparatus has sensors for detecting placement of tokens and a scanner for scanning the game cards. The apparatus has at least one processor and a memory, the memory storing instructions executed by the processor for directing the sensors, the scanner, at least one rule set for winning the game and an output device to indicate winner of the game.

19 Claims, 5 Drawing Sheets

SYSTEM AND METHOD FOR MANAGING A CASINO-STYLE BATTLESHIPS GAME

FIELD OF THE INVENTION

The present invention relates to a system and method for managing a casino-style game of battleships.

SUMMARY OF THE INVENTION

The present invention provides an apparatus and a method for managing a casino-style game of battleships, implementations of which includes one or more of the following.

There is provided, in accordance with one embodiment of the present invention, a game apparatus for facilitating a game of casino battleships between a dealer and at least one player, comprising:

a plurality of identical game grids comprising a dealer's game grid and at least one player's game grid, each one of the game grids having a plurality of predefined game positions, each predefined game position operatively associated with a unique identifier game grid code, the game grids having grid sensors operable to detect data relating to placement of tokens at each of the predefined game positions;

a game card scanner operable to detect data relating to selection of dealer-drawn game cards, each game card associated with a unique identifier game card code identical and corresponding to a game grid code for matching the drawn game card with a specific one of the predefined game positions;

at least one processor configured to communicate with at least one computing device over a communication network; and a memory, in which the memory stores instructions which, when executed by the at least one processor, direct the at least one processor to:

retrieve at least one rule set for playing and winning the game;

direct the grid sensors to determine the predefined game positions upon which the tokens have been placed;

direct the game card scanner to identify the game card code of each drawn game card;

mark as destroyed each predefined game position that matches with a drawn game card;

determine and identify on an output device, after all game cards have been drawn, which one of the dealer and the at least one player is winner of the game according to the at least one rule set.

In one embodiment, the game apparatus further comprises a gaming table.

In one embodiment, scanner of the game apparatus is an RFID scanner and the game cards are RFID scannable cards.

In one embodiment, the dealer's game grid and the at least one player's game grid are configured to scan magnets affixed to, or integrally formed with, the tokens.

In one embodiment, the output device of the game apparatus is a display device, and wherein, the instructions, when executed by the at least one processor, further directs the at least one processor to display, when all game cards have been drawn, an indication of which one of the dealer and one or more of the at least one player is winner of the game according to the at least one rule set.

In one embodiment, mine cards are provided, each mine card being associated with a computer-generated rule using a computer-generated random number generator for matching with a specific one of the predefined game positions;

wherein the instructions, when executed by the at least one processor, further directs the at least one processor to mark as destroyed each predefined game position that matches with a drawn mine card and the token placed on the destroyed predefined game position; and determine and identify on the output device, when all game cards and mine cards have been drawn, which one of the dealer and one or more of the at least one player is winner of the game according to the at least one rule set.

In one embodiment, mine cards are provided, each mine card being associated with a computer-generated rule having an instruction to select an undestroyed predefined game position adjacent to, and to the right of, the last destroyed predefined game position;

wherein the instructions, when executed by the at least one processor, further directs the at least one processor to mark as destroyed the selected predefined game position and the token placed on the destroyed predefined game position; and determine and identify on an output device, when all game cards and mine cards have been drawn, which one of the dealer and one or more of the at least one player is winner of the game according to the at least one rule set.

In one embodiment, the output device of the game apparatus is a display device, and wherein, the instructions, when executed by the at least one processor, further directs the at least one processor to display, when all game cards and mine cards have been drawn, an indication of which one of the dealer and one or more of the at least one player is winner of the game according to the at least one rule set.

In one embodiment, the output device of the game apparatus is a display device, and wherein, the instructions, when executed by the at least one processor, further directs the at least one processor to display, when all game cards and mine cards have been drawn, an indication of which one of the dealer and one or more of the at least one player is winner of the game according to the at least one rule set.

There is provided, in accordance with one embodiment of the present invention, a slot machine apparatus for facilitating a game of casino battleships between a virtual dealer and at least one player, comprising:

a main housing;

a display device;

at least one processor configured to communicate with at least one computing device over a communication network; and a memory, in which the memory stores instructions which, when executed by the at least one processor, direct the at least one processor to:

retrieve at least one rule set for playing and winning the game;

initiate and display as an output on the display device, a virtual dealer's game grid and at least one player's game grid, each of the game grids having a plurality of predefined game positions, each predefined game position being associated with a unique identifier game grid code;

initiate and display as an output on the display device, a predefined number of virtual tokens to the virtual dealer and the at least one player;

track and display as an output on the display device, selecting a predefined number of predefined game positions by the at least one player and placing one of the at least one player's tokens on each of the selected predefined game positions;

initiate and display as an output on the display device, selecting a predefined number of predefined game positions by the virtual dealer according to a computer-generated rule using a computer-generated random number generator and placing one of the dealer's tokens on each of the selected predefined game positions;

initiate and display as an output on the display device, drawing of game cards, each game card having a unique identifier game card code identical and corresponding to a game grid code for matching the drawn game card with a specific one of the predefined game positions;

identify and display as an output on the display device, the game card code of each drawn game card;

mark and display as an output on the display device, as destroyed, each predefined game position that matches with a drawn game card;

determine and display as an output on the display device, when all the game cards have been drawn, which one of the dealer and the at least one player is winner of the game according to the at least one rule set.

There is provided, in accordance with one embodiment of the present invention, a method of using a game apparatus to facilitate a game of casino battleships between a dealer and at least one player, the method comprising the steps of:

providing a plurality of game grids, the game grids comprising a dealer's game grid and at least one player's game grid, each one of the game grids having a plurality of predefined game positions, each predefined game position being associated with a unique identifier game grid code, the game grids having grid sensors operable to detect data relating to placement of tokens at each of the predefined game positions;

providing a predefined number of the tokens to the dealer and the at least one player, the dealer and the at least one player selecting predefined game positions upon which to place their respective tokens;

retrieving at least one rule set for playing and winning the game;

identifying, with the grid sensors, the predefined game positions upon which the tokens have been placed on the game grids;

drawing game cards, each game card having a unique identifier game card code identical and corresponding to a game grid code for matching the drawn game card with a specific one of the predefined game positions;

identifying, with a scanner operable to detect data relating to selection of the drawn game cards, the game card code of each of the drawn game cards;

marking as destroyed each predefined game position that matches with a drawn game card and the token placed on the destroyed predefined game position;

determining and identifying on an output device, when all game cards have been drawn, which one of the dealer and one or more of the at least one player is winner of the game according to the at least one rule set.

In one embodiment, the method utilizes a gaming table.

In one embodiment, the scanner utilized by the method is an RFID scanner and wherein the game cards are RFID scannable cards.

In one embodiment, the dealer's game grid and the at least one player's game grid, as utilized by the method, are configured to scan magnets affixed to, or integrally formed with, the tokens.

In one embodiment, the output device utilized by the method is a display device, and wherein, the instructions, when executed by the at least one processor, further directs the at least one processor to display on the display device, when all game cards have been drawn, an indication of which one of the dealer and one or more of the at least one player is winner of the game according to the at least one rule set.

In one embodiment, the method further utilizes mine cards, each mine card being associated with a computer-generated rule using a computer-generated random number generator for matching with a specific one of the predefined game positions;

wherein the instructions, when executed by the at least one processor, further directs the at least one processor to mark as destroyed each predefined game position that matches with a drawn mine card and the token placed on the destroyed predefined game position; and determine and identify on an output device, when all game cards and mine cards have been drawn, which one of the dealer and one or more of the at least one player is winner of the game according to the at least one rule set.

In one embodiment, the method further utilizes mine cards, each mine card being associated with a computer-generated rule having an instruction to select an undestroyed predefined game position adjacent to, and to the right of, the last destroyed predefined game position;

wherein the instructions, when executed by the at least one processor, further directs the at least one processor to mark as destroyed the selected predefined game position and the token placed on the destroyed predefined game position; and determine and identify on an output device, when all game cards and mine cards have been drawn, which one of the dealer and one or more of the at least one player is winner of the game according to the at least one rule set.

In one embodiment, the output device utilized by the method is a display device, and wherein, the instructions, when executed by the at least one processor, further directs the at least one processor to display on the display device, when all game cards and mine cards have been drawn, an indication of which one of the dealer and one or more of the at least one player is winner of the game according to the at least one rule set.

In one embodiment, the output device utilized by the method is a display device, and wherein, the instructions, when executed by the at least one processor, further directs the at least one processor to display on the display device, when all game cards and mine cards have been drawn, an indication of which one of the dealer and one or more of the at least one player is winner of the game according to the at least one rule set.

BRIEF DESCRIPTION OF THE DRAWINGS

Like reference numbers and designations in the various drawings indicate like elements.

DETAILED DESCRIPTION OF THE PREFERRED EMBODIMENT

Figure 1:
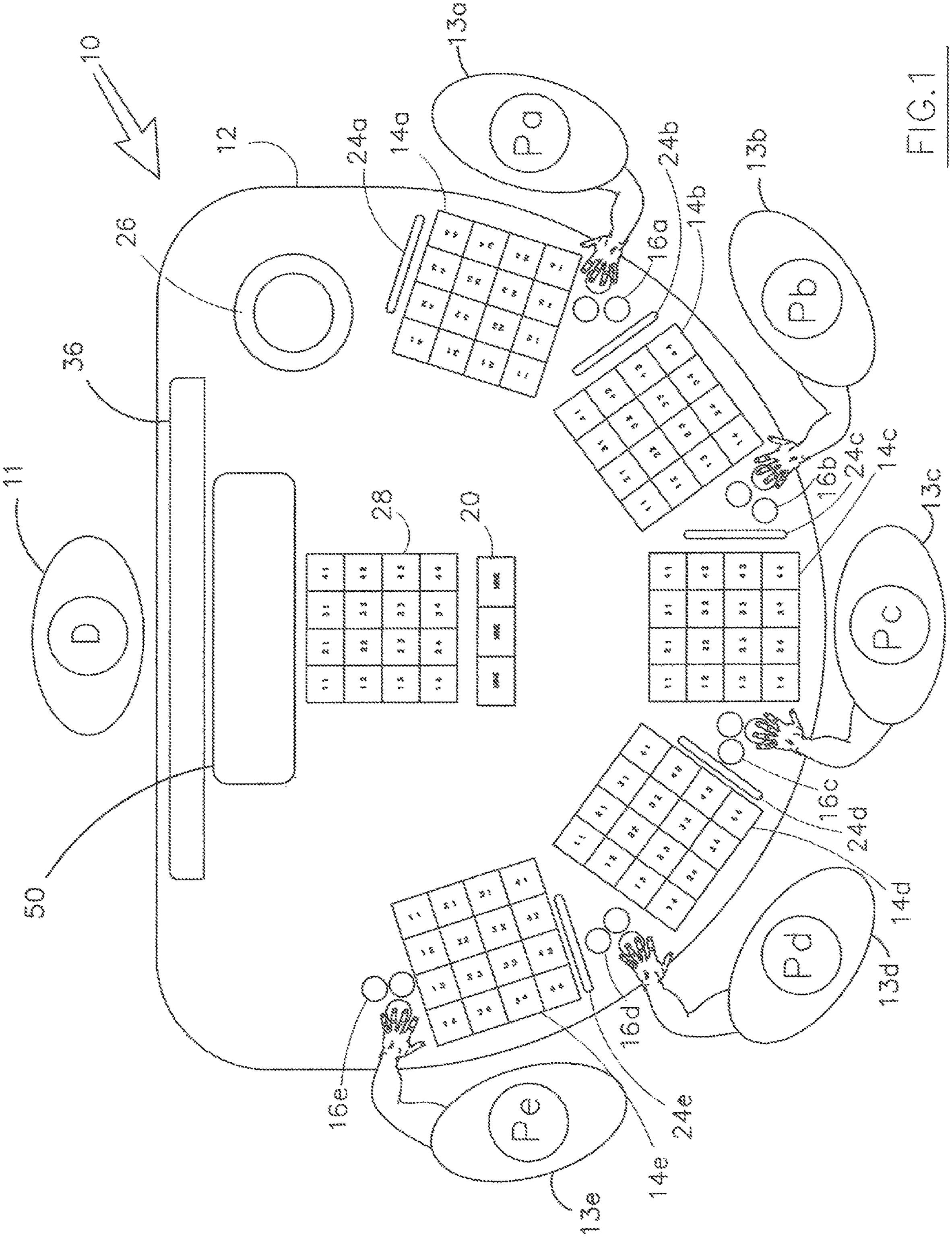
FIG. 1 illustrates a top view of an example of the casino battleships game in accordance with some embodiments described herein.

Reference will be made in detail to the embodiments of the disclosure, examples of which are illustrated in the accompanying drawings.

Basic Rules and Gameplay

The casino battleships game of the present invention (hereinafter, "the game") is played with a dealer against one or more players. The dealer plays against each individual player; the players do not compete/play against each other.

In one embodiment, the dealer and the players each have identical 16-square game grids (i.e., a 4×4 grid) and each receives three game tokens. Each square in the 16-square game grid contains a non-repeating two-digit numeral and is numbered in ascending order from top to bottom (along the Y-axis) and from left to right (along the X-axis). For example, where the top-left corner square is numbered "11", the square immediately below square "11" along the outer-left column may be numbered "12", the next square immediately below square "12" along the outer-left column is numbered "13", etc. Similarly, the top-left corner square may be numbered "11" (as mentioned), the square to the immediate right of square "11" along the top row is numbered "21", the square to the immediate right of square "21" along the top row is numbered "31", etc. In another embodiment, the two-digit numerals may be substituted with non-repeating alphanumeric characters or non-alphanumeric characters, or a combination thereof, and arranged according to known conventions in the art.

In one embodiment, prior to beginning a game hand/round, the dealer selects three squares upon which to place its three tokens. Each token represents a separate (complete) "battleship." Only one token may be placed per square per game grid. In one embodiment, the players may select any squares upon which to place their respective tokens. In another embodiment, the dealer makes its selection first, after which the players select from the remaining squares upon which to place their respective tokens (i.e., the players may not select the same squares as the dealer). If multiple players are competing against the dealer in the same hand/round, the players may select all, some or none of the same squares as other players. (As noted above, the players do not compete against each other.) A wager is also set.

In one embodiment, the game is played with a 19-card deck of cards, of which each one of 16 cards are numbered identically to, and corresponding with, a respective one of the 16 numbered squares in the game grids. For example, if the top-left corner square of the game grid is numbered "11", there will be a corresponding game card (interchangeably referred to as "playing card") bearing the number "11". When a game card is drawn, the corresponding (i.e., identically numbered) square on the game grid, as well as any ship/token on it, is destroyed/eliminated from play. For example, if the game card bearing the number "13" is drawn, and two players placed one token each on the number "13" square on their respective game grids, both players would lose the ships represented by those tokens. In another embodiment, the cards are identified with alphanumeric or non-alphanumeric characters, or a combination thereof, corresponding with the convention used with the game grids, as described above.

The aforementioned 19-card deck of cards also includes three (3) bonus cards called "mines" or "mine cards," which provide a house edge to the casino as follows: One (1) card, when drawn, will destroy one random undestroyed square on the dealer's game grid only (while the identically numbered square on the respective player game grids is unaffected). The other two (2) mine cards, when drawn, will destroy a random undestroyed square on the players grids only (while the identically numbered square on the dealer's game grid is unaffected).

In one embodiment, the game is configured to use either one of following two methods to determine which square will be eliminated when a "mine" card is drawn: (1) a computer-generated random number generator; or (2) a computer-implemented rule/instruction to select and eliminate the first undestroyed square to the right of the previously destroyed square.

In one embodiment, the game includes sets of rule (or "rule sets") for winning a hand/round. A "hand" or round is one bet/wager, which concludes after all 19 cards have been drawn and the wager has been settled.

A first rule set is as follows:

- The player wins (and the dealer loses) the hand if some of the player's ships remain after all of the dealer's ships have been destroyed.
- The dealer wins (and the player loses) the hand if some of the dealer's ships remain after all of the player's ships have been destroyed.
- A tie is possible; for example, where both the player and the dealer lose their last/third ship/token at the same time with the same drawn card. (In the casino industry this is known as a "Push" where the wager is neither won nor lost and his original bet is returned to the player.)

A second rule set comprises the rules for including a "bonus" to the original wager, as described below.

In one embodiment, a player may receive a bonus, at the discretion of the casino (i.e., depending on whether the casino wishes to increase or decrease the house edge), if all three of the player's ships remain after all three of the dealer's ships have been destroyed.

The game can be modified to feature a differently sized or geometrically arranged game grid, a different number of game cards, and a different number of tokens, according to any conventional means known in the art. For instance, the game grid can be arranged in the form of a rectangle, hexagon, octagon or circle, and have 16 game positions/squares, or from between 12 and 24 game positions/squares. Similarly, the game positions can be in the form of circles or other geometric shapes. For simplicity, game positions will typically be referred to herein as "square," regardless of the actual geometric shape of the game position.

SideBet: Dealer Destruction

In one embodiment, the game is configured to allow a player to place an extra wager on the side prior to beginning a hand. This is referred to as a "SideBet." The outcome of the SideBet is determined by how many cards are required to be drawn to destroy all three (3) of only the dealer's ships (i.e., regardless of whether the player "outlives" the dealer). For example, if the dealer's ships are destroyed on turns 3 through 12, the player will win the SideBet and receive an appropriate payment dependent on the turn the game ends on: a higher payout where a smaller number of cards are required, and a lower payout where a smaller number of cards are required. If the dealer's ships are destroyed after turn 12 (i.e., turns 13 through 19) the casino will win the SideBet.

In the embodiment (s) described herein, the game is operatively associated with a gaming apparatus having various computer hardware. As will be described below, the system hardware can be housed within a gaming table, a slot machine or another conventional apparatus as would be apparent to a person having ordinary skill in the art. The system hardware is exemplarily identified in the list of reference numerals provided below. The system hardware may be internally housed in the apparatus. Alternatively, some of the system hardware components may be housed external to the apparatus according to any arrangement as would be apparent to a person having ordinary skill in the art.

Gaming Table

FIG. 1 illustrates the game as played at a gaming table according to one embodiment. In this embodiment, game 10 requires gaming table 12 that is occupied, during play, by a dealer 12 and at least one player 13. Dealer 11 has a 16-square dealer's game grid 28 (as described above), and player 13 has a 16-square player's game grid 14 (as described above). In the embodiment illustrated in FIG. 1, there are five players (e.g., players 13*a*, 13*b*, 13*c*, 13*d* and 13*e*). Each of the players has a respective game grid 14 (e.g., game grids 14*a*, 14*b*, 14*c*, 14*d* and 14*e*). Each player has three (3) tokens 16 (e.g., tokens 16*a*, 16*b*, 16*c*, 16*d* and 16*e*). Each player has a respective player betting location 24 (e.g., player betting locations 24*a*, 24*b*, 24*c*, 24*d* and 24*e*). The game grid squares (in both the dealer's and players game grids) are shown as numbered in ascending order from top to bottom (along the Y-axis) and from left to right (along the X-axis). In the illustration shown in FIG. 1, the game grid squares are so numbered, from top to bottom: 11, 12, 13 and 14 along the outer-left column, 21, 22, 23 and 24 along the inner-left column, 31, 32, 33 and 34 along the inner-right column, and 41, 42, 43 and 44 along the outer-right column. The selection of specific numbers, as well as the numbering system and arrangement, are entirely arbitrary and can be configured according to any conventional system.

As illustrated in FIG. 1, gaming table 12 further comprises a mine card grid 20, an RFID scanner 26, a computer screen 36, and a dealer discard tray 50. In one embodiment, the 19 game cards (described above) are RFID cards, or are cards with which RFID tags have been embedded, affixed or attached/connected in any manner as would be understood by a person having ordinary skill in the art. In another embodiment, the game cards contain scannable bar codes and the gaming table includes a bar code scanner.

In one embodiment, magnets, or other suitable apparatus, such as, but not limited to, RFID chips/tags, are embedded, affixed or attached/connected to the tokens in any manner as would be understood by a person having ordinary skill in the art. In one embodiment, the tokens are read/scanned by sensors in the dealer's and players game grids to determine location of the placed/played tokens. In another embodiment, the game grids include weight sensors or simple push buttons to detect the placement of tokens on grid squares. In yet another embodiment, the game grids are configured to detect placement of tokens on grid squares via any one of lasers, a scanner with image recognition, or a camera/optical device.

In one embodiment, each square of the game grids is configured as an independent board game circuit tile and includes an integrated LED beacon that lights up (i.e., a "first color") when a token is placed on the square. In one embodiment, as cards are drawn from the card holder (which may also be referred to as the "shoe"), the cards are read/scanned by RFID scanner 26 and the gaming table marks which squares are destroyed/eliminated as the game cards are drawn. In one embodiment, a destroyed square is indicated or marked by a change to its color (i.e., a "second color").

In one embodiment, in lieu of placing physical tokens as described above, the game grids are configured with depressible, manipulable or otherwise engageable features, as would be known to a person having ordinary skill in the art, which, when depressed, manipulated or engaged, indicate the selection of a particular square for play. Such indications may include, but are not limited to, lighting up of the selected square, as described above.

In one embodiment, touch screens are provided. Each touch screen displays a virtual game grid and virtual tokens for placement on selected squares of the virtual grids. Such placement may include, but is not limited to, any one of the following: (1) virtually "dragging" the tokens across the touch screen from an initial position off to the side of the virtual game grid and onto the selected squares; (2) tapping on the selected squares, whereby each one of the selected squares becomes populated with a virtual token; (3) tapping on a particular token and then tapping on a particular square, whereby the selected token "disappears" or is removed from its initial position and reappears on the selected square, or (4) any other conventional means known in the art. The touch screen is affixed, or connected by cable or other conventional means, or is wirelessly connected by any conventional means, to the gaming table. The gaming table optionally has an aperture for receiving the touch screen (i.e., the touch screen "docks" with the aperture).

In one embodiment, the dealer is a "virtual" or computer-controlled dealer, displayed on computer screen 36, whose selection of squares on its game grid is provided by a computer-generated rule using a computer-generated random number generator.

Figure 3:
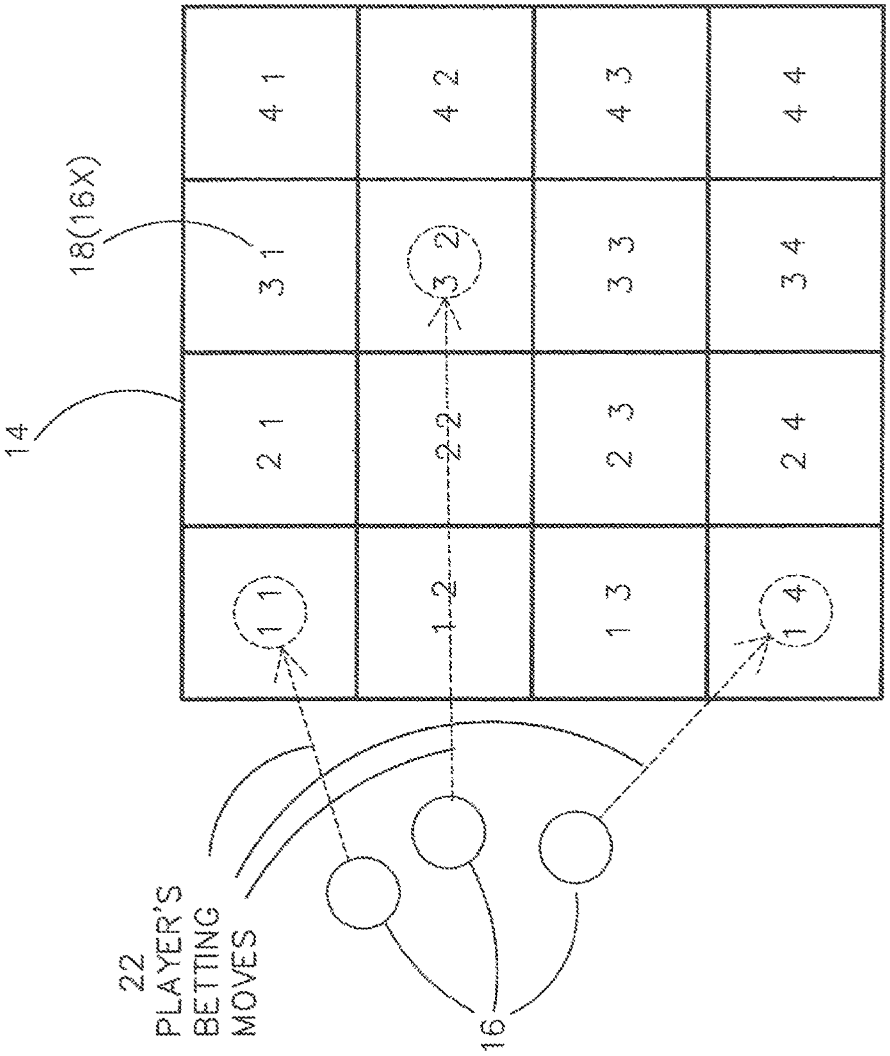
FIG. 3 illustrates a player's game board grid in accordance with some embodiments described herein.

As described above, prior to play beginning, the dealer and the players must each place all three of their tokens on squares of their choosing on their respective game grids, with only one token placed per square per game grid. In the illustration shown in FIG. 3, for instance, the player's betting moves 22 include placement of the three tokens 16 at the squares numbered "11", "14" and "32" on game grid 14.

Figure 2:
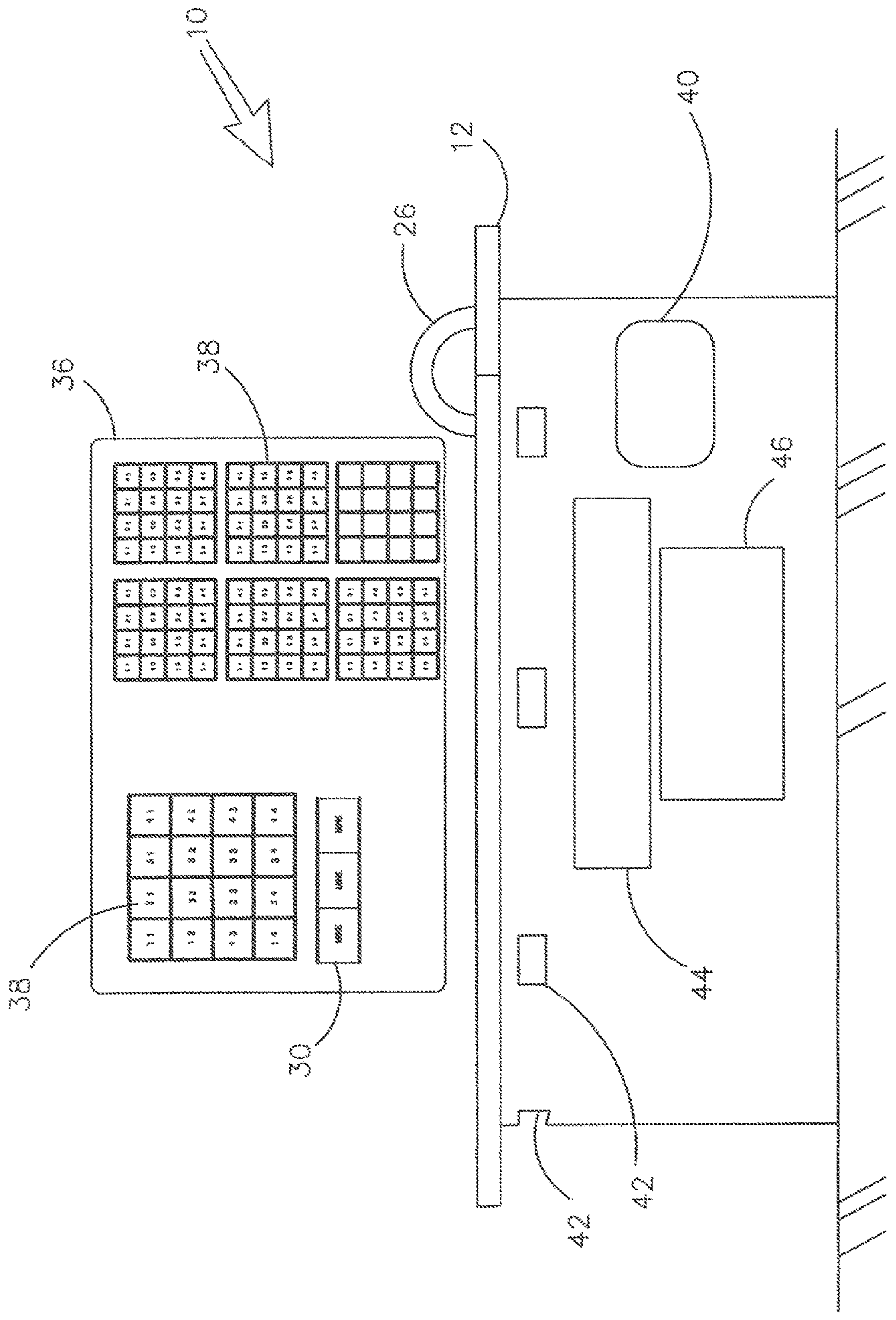
FIG. 2 illustrates a front view of an example of the casino battleships game in accordance with some embodiments described herein.

FIG. 2 illustrates, according to one embodiment, a front view of gaming table 12, in which a computer screen 36 is shown. Computer screen 36 is positioned behind dealer 11 (not shown) and includes a plurality of player computer information screens 38, of which each one represents a respective player's game grid. Also shown is RFID scanner 26, a power supply 40, a plurality of winning cash slots 42 (one for each player), memory recorder 44 and manifold cables and computer 46.

Figure 4:
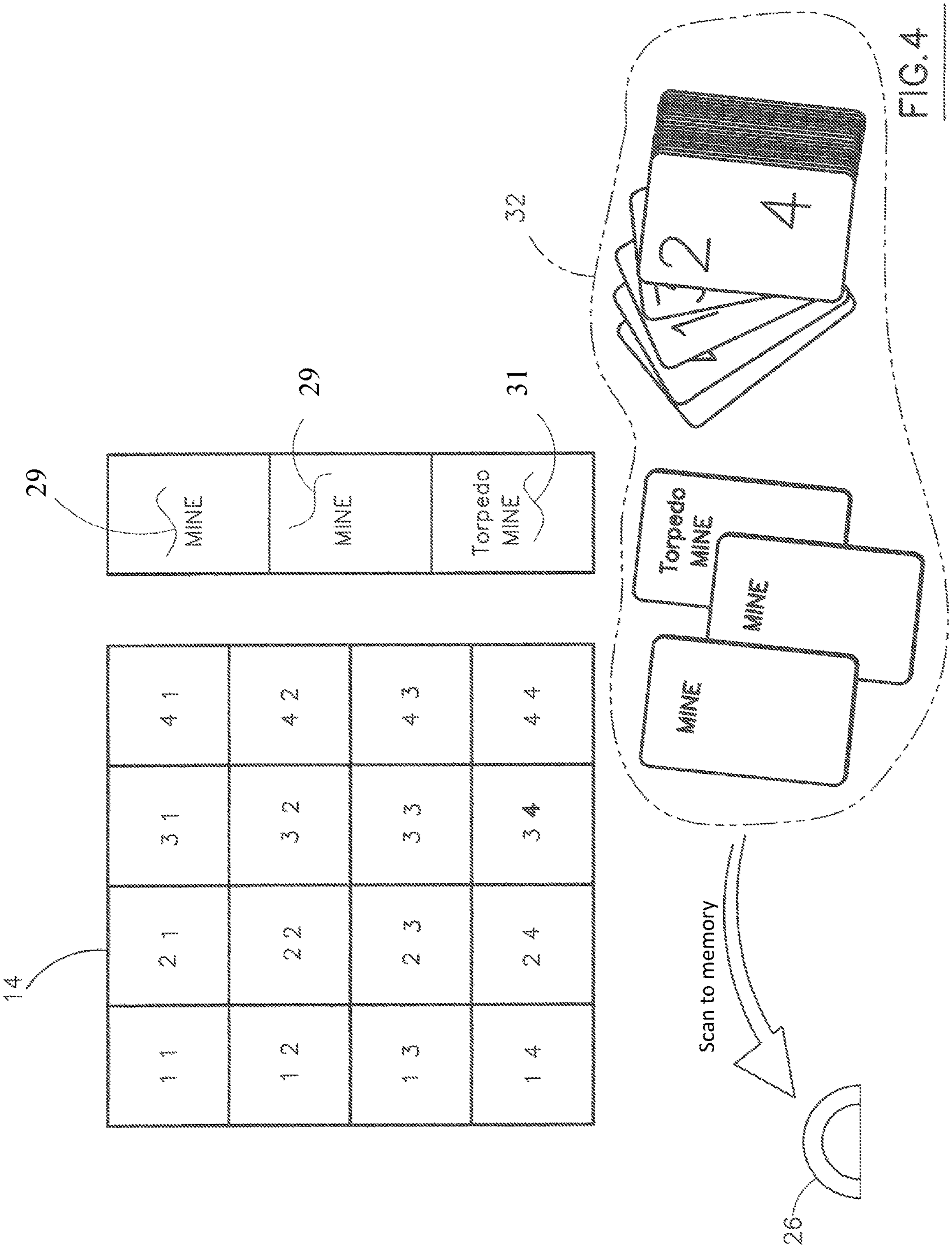
FIG. 4 illustrates a view a game grid, game cards and game card scanner in accordance with some embodiments described herein.

FIG. 4 illustrates, according to one embodiment, a 19-card deck of cards 32 randomly "shuffled" or arranged for random draw by dealer 11 (not shown), including the 16 numbered game cards described above, and three "mine" cards (34), comprising two "mine" cards for use against the players and one "torpedo mine" card for use against the dealer, as described above. Also shown are a player game grid 14, a mine card grid (20) including mine card "hits" 29 and a torpedo card hit 31, and RFID scanner 26 with which to scan the game cards, as indicated with an arrow.

Figure 5:
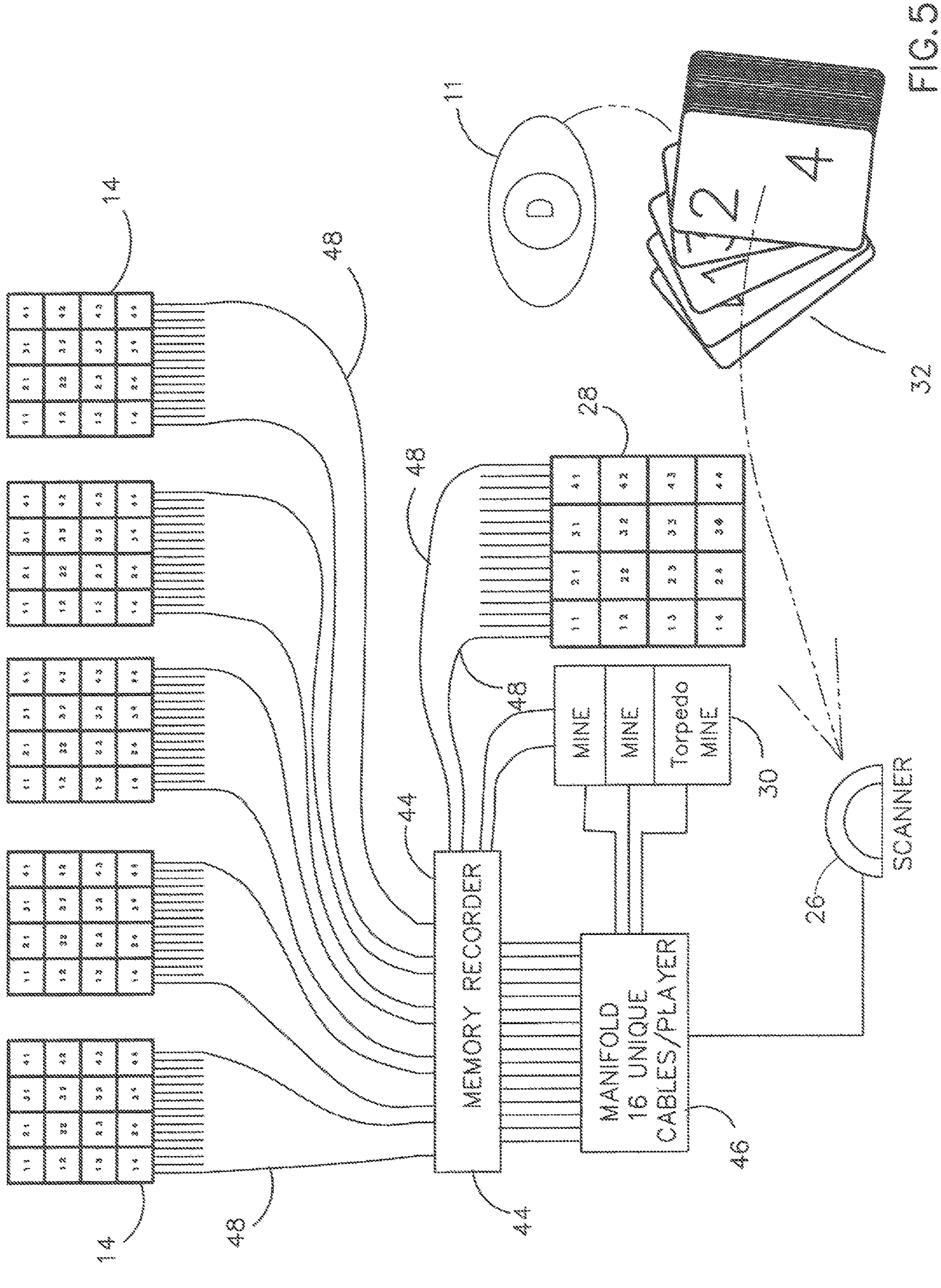
FIG. 5 illustrates a gaming visual player information and security in accordance with some embodiments described herein.

FIG. 5 illustrates, according to one embodiment, the system and method of gaming information being entered and stored in computer memory. Players game grids 14, and dealer's game grid 28, are shown connected by (multiple) shielded cables 48 to a memory recorder 44. As dealer 11 deals each one of game cards 32, the drawn game card is scanned by RFID scanner 26 and data is transmitted to manifold cables and computer 46, from which the history of scanned game cards, including history 30 of hits by the "mine" cards, is then transmitted to memory recorded 44.

Slot Machine Apparatus

In one embodiment, the game is operatively associated with a slot machine apparatus (hereinafter, the "slot machine"). The slot machine has a number of different configurations derived from any one (or combination) of a number of different conventional configurations as would be known to a person having ordinary skill in the art. In the slot machine embodiments described below, the dealer is a "virtual" or computer-controlled dealer whose selection of squares on its game grid is provided by a computer-generated rule using a computer-generated random number generator.

In one embodiment, the computer-generated random number generator randomly selects three squares from among any of the squares on the virtual dealer's game grid upon which to virtually place its tokens.

In one embodiment, the virtual dealer makes the first selection. In another embodiment, slot machine is configured such that the human player makes the first selection. In this embodiment, the computer-generated random number generator selects any three squares irrespective of which squares the human player selected on the player's game grid. In another embodiment, the computer-generated random number generator excludes, from its (subsequent) selection for the virtual dealer, those squares selected by the human player on the player's game grid. In another embodiment, both the player and the dealer make their respective selections concurrently.

The following are examples of some, but not all, possible configurations of the game as operatively associated with the slot machine:

In one embodiment, the slot machine is configured with physical tokens for use by the player, as described above in connection with the gaming table embodiments. In this embodiment, the tokens are placed by the player (s) on a physical game grid, which is affixed, or connected by cable or other conventional means, or is wirelessly connected by any conventional means, to the slot machine. In another embodiment, in lieu of using tokens, each square of the game grid contains a depressible button or other manipulable feature which, when engaged, is read by the machine as placement of a "token" on that square.

In one embodiment, the slot machine is configured for single-player use (i.e., by a single human player), where the single player competes against the (virtual) dealer (and the casino). In another embodiment, the slot machine is configured with two or more player game grids, each game grid having an associated set of tokens for use by a respective human player. Each player competes against the virtual dealer only and not against the other player (s).

In each of the aforementioned slot machine embodiments and configurations described above, the slot machine includes a display screen/unit, or other conventional display means, to visually display the dealer's (virtual) play on the dealer's (virtual) game grid and, where applicable, the play of the one or more human players.

In one embodiment, the system hardware is housed within the slot machine body (exceptions include, but are not limited to, exit network cables, exit power cables, etc., as would be understood by a person having ordinary skill in the art). This embodiment includes integrated tokens and one or more integrated game grid (s). In one embodiment, such integrated game grid(s) are virtually provided on a touch screen integrally formed with the slot machine.

In one embodiment, the aforementioned touch screen is configured according to any one of the following embodiments:

In one embodiment, the touch screen is detachably coupled to the slot machine. In another embodiment, the touch screen is connected by cable or other conventional means, or is wirelessly connected by any conventional means, to the slot machine. In both of the foregoing embodiments, the slot machine has an aperture for receiving the touch screen (i.e., the touch screen "docks" with the aperture).

In any of the aforementioned embodiments including a slot machine having a touch screen, the tokens are virtually displayed on the touch screen, whereby each token is placed on a selected square in the same manner as described above in connection with the gaming table embodiments.

The system hardware, including the hardware identified in the list of reference numerals provided below, can be housed within the slot machine, external to the slot machine, or partially within and partially external to the slot machine, according to any arrangement as would be apparent to a person having ordinary skill in the art.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer readable storage device, a computer readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described.

The following is a list of reference numerals and associated parts as used in this specification and drawings:

| Part | Reference Numeral |
|---|---|
| Casino battleship game | 10 |
| Dealer | 11 |
| Gaming table | 12 |
| Players (a, b, c, d, e . . .) | 13 |
| Players game grid (a, b, c, d, e . . .) | 14 |
| Players (a, b, c, d, e . . .) tokens | 16 |
| Game grid showing token (16) location | 18(16X) |
| Mine cards grid | 20 |
| Players (54) placement of tokens (16) example | 22 |
| Players betting wager locations (a, b, c, d, e . . .) | 24 |
| RFID scanner | 26 |
| Dealer game grid | 28 |
| Mine card "hit(s)" | 29 |
| Computer screen (36) history of "Mine" hits | 30 |
| Torpedo card "hit" | 31 |
| 19 random cards: 16 game cards + 3 mine cards | 32 |
| 2 mine cards + 1 torpedo card | 34 |
| Computer screen (Display device) | 36 |
| Player computer information on screen (36) | 38 |
| Power supply | 40 |
| Winning cash slot | 42 |
| Memory recorder | 44 |
| Manifold cables and computer | 46 |
| Shielded cable (multiple) | 48 |
| Dealer discard tray | 50 |

While the invention has been described in its preferred forms or embodiments with some degree of particularity, it is understood that this description has been given only by way of example and that numerous changes may be made without departing from the spirit and scope of the invention.

What is claimed:

1. A game apparatus for facilitating a game of casino battleships between a dealer and at least one player, comprising:

a plurality of identical game grids comprising a dealer's game grid and at least one player's game grid, each one of the game grids having a plurality of predefined game positions, each predefined game position operatively associated with a unique identifier game grid code, the game grids having grid sensors operable to detect data relating to placement of tokens at each of the predefined game positions;

a game card scanner operable to detect data relating to selection of dealer-drawn game cards, each game card associated with a unique identifier game card code identical and corresponding to a game grid code for matching the drawn game card with a specific one of the predefined game positions;

at least one processor configured to communicate with at least one computing device over a communication network; and a memory, in which the memory stores instructions which, when executed by the at least one processor, direct the at least one processor to:

retrieve at least one rule set for playing and winning the game;

direct the grid sensors to determine the predefined game positions upon which the tokens have been placed;

direct the game card scanner to identify the game card code of each drawn game card;

mark as destroyed each predefined game position that matches with a drawn game card;

determine and identify on an output device, after all game cards have been drawn, which one of the dealer and the at least one player is winner of the game according to the at least one rule set.

2. The game apparatus of claim 1, further comprising a gaming table.

3. The game apparatus of claim 1, wherein the scanner is an RFID scanner and wherein the game cards are RFID scannable cards.

4. The game apparatus of claim 1, wherein the dealer's game grid and the at least one player's game grid are configured to scan magnets affixed to, or integrally formed with, the tokens.

5. The game apparatus of claim 1, wherein the output device is a display device, and wherein, the instructions, when executed by the at least one processor, further directs the at least one processor to display, when all game cards have been drawn, an indication of which one of the dealer and one or more of the at least one player is winner of the game according to the at least one rule set.

6. The game apparatus of claim 1, further comprising mine cards, each mine card being associated with a computer-generated rule using a computer-generated random number generator for matching with a specific one of the predefined game positions;

wherein the instructions, when executed by the at least one processor, further directs the at least one processor to mark as destroyed each predefined game position that matches with a drawn mine card and the token placed on the destroyed predefined game position; and determine and identify on the output device, when all game cards and mine cards have been drawn, which one of the dealer and one or more of the at least one player is winner of the game according to the at least one rule set.

7. The game apparatus of claim 1, further comprising mine cards, each mine card being associated with a computer-generated rule having an instruction to select an undestroyed predefined game position adjacent to, and to the right of, the last destroyed predefined game position;

wherein the instructions, when executed by the at least one processor, further directs the at least one processor to mark as destroyed the selected predefined game position and the token placed on the destroyed predefined game position; and determine and identify on an output device, when all game cards and mine cards have been drawn, which one of the dealer and one or more of the at least one player is winner of the game according to the at least one rule set.

8. The game apparatus of claim 6, wherein the output device is a display device, and wherein, the instructions, when executed by the at least one processor, further directs the at least one processor to display, when all game cards and mine cards have been drawn, an indication of which one of the dealer and one or more of the at least one player is winner of the game according to the at least one rule set.

9. The game apparatus of claim 7, wherein the output device is a display device, and wherein, the instructions, when executed by the at least one processor, further directs the at least one processor to display, when all game cards and mine cards have been drawn, an indication of which one of the dealer and one or more of the at least one player is winner of the game according to the at least one rule set.

10. A slot machine apparatus for facilitating a game of casino battleships between a virtual dealer and at least one player, comprising:

a main housing;

a display device;

at least one processor configured to communicate with at least one computing device over a communication network; and a memory, in which the memory stores instructions which, when executed by the at least one processor, direct the at least one processor to:

retrieve at least one rule set for playing and winning the game;

initiate and display as an output on the display device, a virtual dealer's game grid and at least one player's game grid, each of the game grids having a plurality of predefined game positions, each predefined game position being associated with a unique identifier game grid code;

initiate and display as an output on the display device, a predefined number of virtual tokens to the virtual dealer and the at least one player;

track and display as an output on the display device, selecting a predefined number of predefined game positions by the at least one player and placing one of the at least one player's tokens on each of the selected predefined game positions;

initiate and display as an output on the display device, selecting a predefined number of predefined game positions by the virtual dealer according to a computer-generated rule using a computer-generated random number generator and placing one of the dealer's tokens on each of the selected predefined game positions;

initiate and display as an output on the display device, drawing of game cards, each game card having a unique identifier game card code identical and corresponding to a game grid code for matching the drawn game card with a specific one of the predefined game positions;

identify and display as an output on the display device, the game card code of each drawn game card;

mark and display as an output on the display device, as destroyed, each predefined game position that matches with a drawn game card;

determine and display as an output on the display device, when all the game cards have been drawn, which one of the dealer and the at least one player is winner of the game according to the at least one rule set.

11. A method of using a game apparatus to facilitate a game of casino battleships between a dealer and at least one player, the method comprising the steps of:

providing a plurality of game grids, the game grids comprising a dealer's game grid and at least one player's game grid, each one of the game grids having a plurality of predefined game positions, each predefined game position being associated with a unique identifier game grid code, the game grids having grid sensors operable to detect data relating to placement of tokens at each of the predefined game positions;

providing a predefined number of the tokens to the dealer and the at least one player, the dealer and the at least one player selecting predefined game positions upon which to place their respective tokens;

retrieving at least one rule set for playing and winning the game;

identifying, with the grid sensors, the predefined game positions upon which the tokens have been placed on the game grids;

drawing game cards, each game card having a unique identifier game card code identical and corresponding to a game grid code for matching the drawn game card with a specific one of the predefined game positions;

identifying, with a scanner operable to detect data relating to selection of the drawn game cards, the game card code of each of the drawn game cards;

marking as destroyed each predefined game position that matches with a drawn game card and the token placed on the destroyed predefined game position;

determining and identifying on an output device, when all game cards have been drawn, which one of the dealer and one or more of the at least one player is winner of the game according to the at least one rule set.

12. The method of claim 11, further comprising a gaming table.

13. The method of claim 11, wherein the scanner is an RFID scanner and wherein the game cards are RFID scannable cards.

14. The method of claim 11, wherein the dealer's game grid and the at least one player's game grid are configured to scan magnets affixed to, or integrally formed with, the tokens.

15. The method of claim 11, wherein the output device is a display device, and wherein, the instructions, when executed by the at least one processor, further directs the at least one processor to display on the display device, when all game cards have been drawn, an indication of which one of the dealer and one or more of the at least one player is winner of the game according to the at least one rule set.

16. The method of claim 11, further comprising mine cards, each mine card being associated with a computer-generated rule using a computer-generated random number generator for matching with a specific one of the predefined game positions;

wherein the instructions, when executed by the at least one processor, further directs the at least one processor to mark as destroyed each predefined game position that matches with a drawn mine card and the token placed on the destroyed predefined game position; and determine and identify on an output device, when all game cards and mine cards have been drawn, which one of the dealer and one or more of the at least one player is winner of the game according to the at least one rule set.

17. The method of claim 11, further comprising mine cards, each mine card being associated with a computer-generated rule having an instruction to select an undestroyed predefined game position adjacent to, and to the right of, the last destroyed predefined game position;

wherein the instructions, when executed by the at least one processor, further directs the at least one processor to mark as destroyed the selected predefined game position and the token placed on the destroyed predefined game position; and determine and identify on an output device, when all game cards and mine cards have been drawn, which one of the dealer and one or more of the at least one player is winner of the game according to the at least one rule set.

18. The method of claim 16, wherein the output device is a display device, and wherein, the instructions, when executed by the at least one processor, further directs the at least one processor to display on the display device, when all game cards and mine cards have been drawn, an indication of which one of the dealer and one or more of the at least one player is winner of the game according to the at least one rule set.

19. The method of claim 17, wherein the output device is a display device, and wherein, the instructions, when executed by the at least one processor, further directs the at least one processor to display on the display device, when all game cards and mine cards have been drawn, an indication of which one of the dealer and one or more of the at least one player is winner of the game according to the at least one rule set.

* * * * *